United States Patent [19]

Kitagawa

[11] Patent Number: 5,454,422

[45] Date of Patent: Oct. 3, 1995

[54] WOODWORKING MACHINES

[75] Inventor: Shinsuke Kitagawa, Fuchu, Japan

[73] Assignee: Kitagawa Kogyo Co., Ltd., Hiroshima, Japan

[21] Appl. No.: 968,430

[22] Filed: Oct. 29, 1992

[51] Int. Cl.$^6$ ............... B27B 1/00; B23C 1/16; G05B 19/19

[52] U.S. Cl. ............ 144/1 A; 144/356; 409/80; 409/99; 364/474.02; 364/474.24

[58] Field of Search ................. 409/80, 93, 99, 409/168, 198, 211, 213, 217, 224; 144/1 R, 1 A, 144 R, 134 R, 356, 2 R; 364/474.02, 474.03, 474.24

[56] References Cited

U.S. PATENT DOCUMENTS

| | | | |
|---|---|---|---|
| 4,512,380 | 4/1985 | Schmidt | 144/1 A |
| 4,945,958 | 8/1990 | Schoda | 144/1 A |
| 5,003,484 | 3/1991 | Vollmayr | 409/99 |
| 5,094,282 | 3/1992 | Suzuki et al. | 144/1 A |

*Primary Examiner*—W. Donald Bray

[57] ABSTRACT

A wookworking machine that can easily and exactly form digitizing data for a plurality of workpieces even during the working operation on the workpieces, thereby considerably increasing the working efficiency. The woodworking machine according to the invention for working of workplaces into specified three dimensional form is characterized in that the woodworking machine is combined with a copying digitizing device and a computer connected to an NC copying digitizing device. The computer loads the NC copying digitizing device with working conditions such as work-starting points and limits, which are calculated by a CAD of the computer. The computer controls and stores the digitizing data formed by the NC copying digitizing device as a control file integrated by a main program. On the basis of the working conditions, the data is stored through the copying operation of the copying head of the woodworking machine. The computer then carries out the driving and control of the woodworking machine on the basis of the digitizing data stored therein.

6 Claims, 4 Drawing Sheets

WOODWORKING MACHINES

BACKGROUND OF THE INVENTION

1. Field of the Invention

This invention relates to woodworking machines, more specifically woodworking machines for carrying out automatic working of wooden works based upon preformed digitizing data.

2. Description of the Prior Art

Conventional woodworking machines are known for desirable working of wooden works by using manual copying machines having a plurality of copying heads for working each work which is driven in synchronous manner with said corresponding copying head. In such woodworking machines, a model having a desired form is copied by operating the copying heads manually, while at the same time a plurality of works are worked into the same form as said model works by a plurality of copying heads driven in synchronous manner with said model copying head.

In another woodworking machines combined with playback/teaching robot, a playback teaching is first carried out for causing the robot to store said copying operation by operating the copying head manually, and the robot carries out then the desired working by operating said copying heads in the following cycles.

In the first manual type of woodworking machines, a operator must operate a woodworking machine. Therefore, this process is so much laborious and needs a high operator's skill for obtaining a stable working quality, thus labor-saving being difficult and heavy cutting operation being limited.

In the second type of woodworking machines, i.e. machines using robot or robots, the first step of playback/teaching needs a long period of time, thus decreasing the productivity of machines.

Accordingly, computer operators input first working conditions such as starting points and limit points, and then output these working conditions into copying digitizing device connected the corresponding computer, this device being then operated thereby to form the digitizing data of corresponding works. These digitizing data are then stored into the computer and are used for driving the woodworking machines for carrying out desired working operations.

However, the woodworking machines using digitizing data stored in a computer have the disadvantage in that at the copying digitizing operation of a works having complicated forms, it is necessary to divide the works into a number of parts and set the working conditions such as starting points and limits. This setting of working conditions needs long periods of time, which decreases the working efficiency.

Further, when forming the digitizing data for respective parts of works, it is necessary to form respective programs for digitizing data of each part and form then a main program integrating these programs, these operations being carried out all manually, so that errors are apt to be caused with respect to working orders, starting points, program numbers and the like.

SUMMARY OF THE INVENTION

For eliminating the above disadvantages, the woodworking machines according to the invention can easily and exactly form the digitizing data for respective parts of works, thereby to considerably increase the working efficiency.

For achieving the object described above, the woodworking machines for working works into prescribed three-dimensional form according to the invention, which are characterized in that, as claimed in claim 1, said woodworking machines are combined with a NC copying digitizing device and a computer connected to said NC copying digitizing device, said NC copying digitizing device being loaded from said computer with working conditions such as work-starting points and limits calculated by CAD of said computer, and said computer controlling and storing, as control file integrated by a main program, the digitizing data formed by said NC copying digitizing device on the basis of said working conditions through the copying operation of copying head of said woodworking machine, said computer carrying out then driving and control of said woodworking machine on the basis of said digitizing data stored therein.

Further, as claimed in claim 2, the woodworking machines as set forth in claim 1, wherein a plurality of said woodworking machines are connected to a single computer, and respective digitizing data are output from said computer to respective woodworking machines in a multitask manner.

In the woodworking machines according to the invention, said NC copying digitizing device is loaded with working conditions such as work-starting points and limits calculated by CAD, and said computer controls and stores, as control file integrated by a main program, the digitizing data formed by said NC copying digitizing device on the basis of said working conditions through a copying operation of copying head of said woodworking machine, said computer carrying out then driving and control of said woodworking machines on the basis of said digitizing data stored therein. Therefore, even in the case of forming respective digitizing data for respective parts of works, it is not necessary to set working conditions and form the control file such as main program by manual operations for respective parts, so that the digitizing data can be easily and exactly formed without errors concerning to working orders, starting point, program numbers and the like. Further, the operation of forming the digitizing data carried out between computer and NC copying digitizing device are separated with each other on the one hand and the working operation of woodworking machines controlled by said computer on the other hand are executed independently from each other, so that the working operation of woodworking machines can be done even during the forming operation of digitizing data.

DETAILED DESCRIPTION OF THE EMBODIMENTS

An embodiment of the woodworking machines according to the invention is described hereinbelow referring to the attached drawings, FIG. 1 –FIG. 6.

Figure 1:
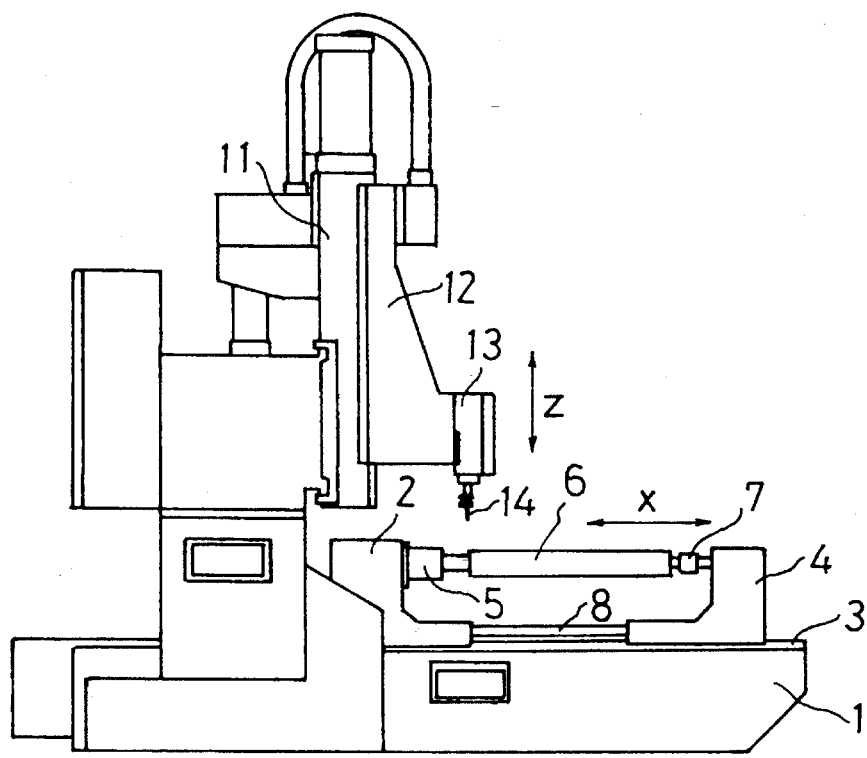
FIG. 1 is a side view of an embodiment of woodworking machines according to the invention.
Figure 3:
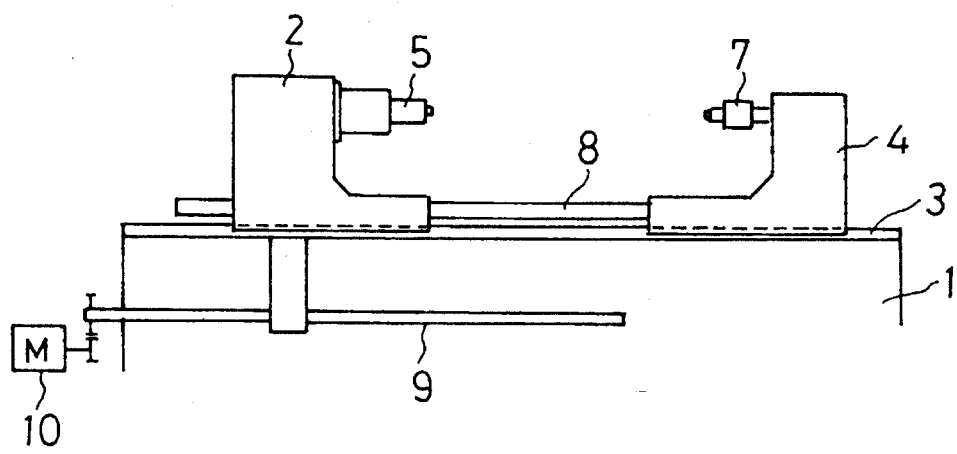
FIG. 3 is an enlarged side of swiveling table of the embodiment shown FIG. 1 and FIG. 2.
Figure 2:
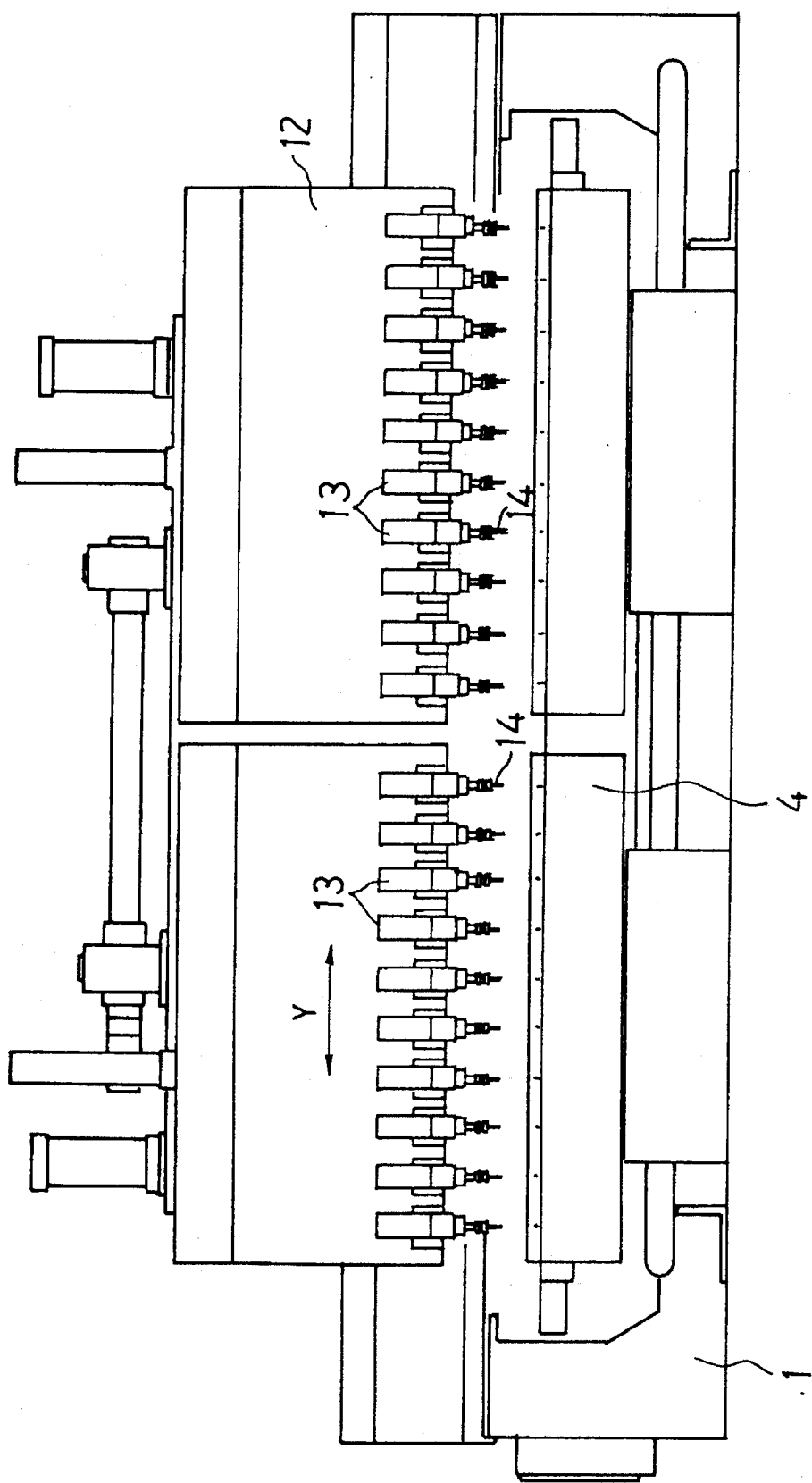
FIG. 2 is a front view of the embodiment shown in FIG. 1.

The woodworking machines shown in FIG. 1 to FIG. 3 have a base plate 1 provided with a linear guide 3 thereon, said linear guide 3 having thereon slidably a swivel table 2 on the one hand and a tailstock 4 confronting said swivel table 2 on the other hand.

The surface of said swivel table 2 confronting said tailstock 4 carries a row of 20 pieces of jigs 5,5 . . . thereon. Said tailstock 4 is provided thereon with holders 7 at respective positions corresponding to those of said jigs, said holders 7 holding and urging towards said jigs 5 respective works 6 by means of cylinders (not shown). Said swiveling table 2 and said tailstock 4 are connected to each other by means of connecting rod 8, so that said tailstock 4 can be moved forward and backward after the connection of said tailstock 4 to said connecting rod 8 has been released, to regulate freely the distance of said swiveling table 2 and said tailstock 4. Further, said swiveling table 2 is connected to a driving motor 10 by means of ball screw 9, so that when said motor 10 is driven, said ball screw 9 is rotated, thereby to move horizontally (in X direction) said swivel table 2 and said tailstock 4 along said linear guide member 3.

A carriage 11 is mounted above said base plate 1 in such a manner to shift left-to-right direction in FIG. 2 (Y direction), and elevating bed 12 is mounted on said carriage 11 in such a manner to shift vertically, i.e. in Z direction. The bottom end of said elevating bed 12 is provided with blade holders 13 at respective positions corresponding to said jigs 5, said blade holders 13 carrying respective cutting blades 14.

Figure 4:
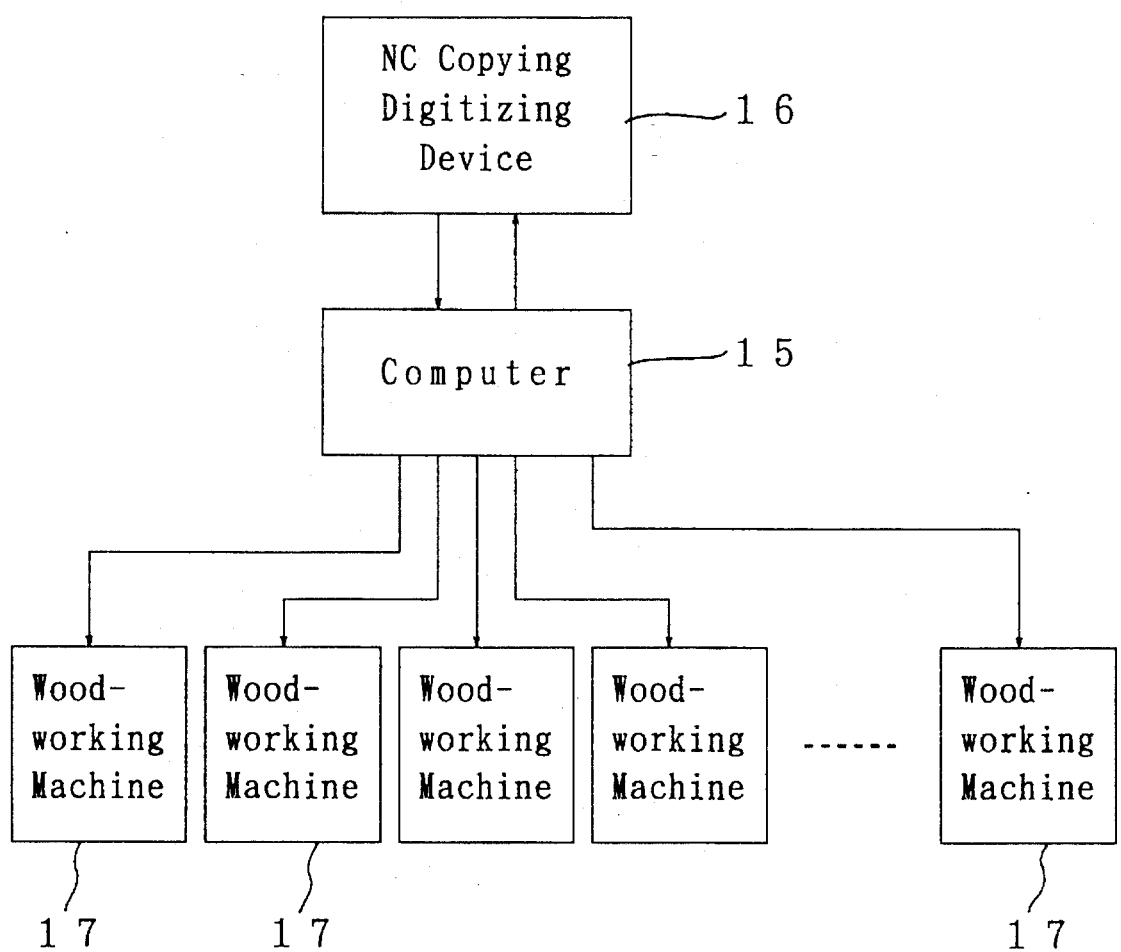
FIG. 4 is a block diagram of control apparatus for the woodworking machines according to the invention.

The control mechanism of woodworking machines according to the invention is described hereinbelow with reference to FIG. 4.

A numerical control (NC) copying digitizing device 16 is connected to a computer 15 such as personal computer, and said computer 15 outputs the working conditions calculated through computer-aided design (CAD) such as starting points and limits of digitizing operation into said NC copying digitizing device, while at the same time said computer 15 stores the digitizing data obtained by said NC copying digitizing device 16. Said NC copying digitizing device 16 traces the surface of a model to be worked from the starting points to said limits by means of a copying head (not shown), thereby to pick up respective coordinates data in X, Y and Z directions for every specified pitch (for example, for every 1 mm) thereby to form digitizing data, which digitizing data are transferred to said computer 15.

A plurality of woodworking machines 17 having the construction as described above are connected to said computer 15, which controls rotation of said swivel table 2, shift of said swivel table 2 in X direction, shift of said carriage 11 in Y direction and shift of said elevating bed 12 in Z direction of respective woodworking machines 17.

Figure 5:
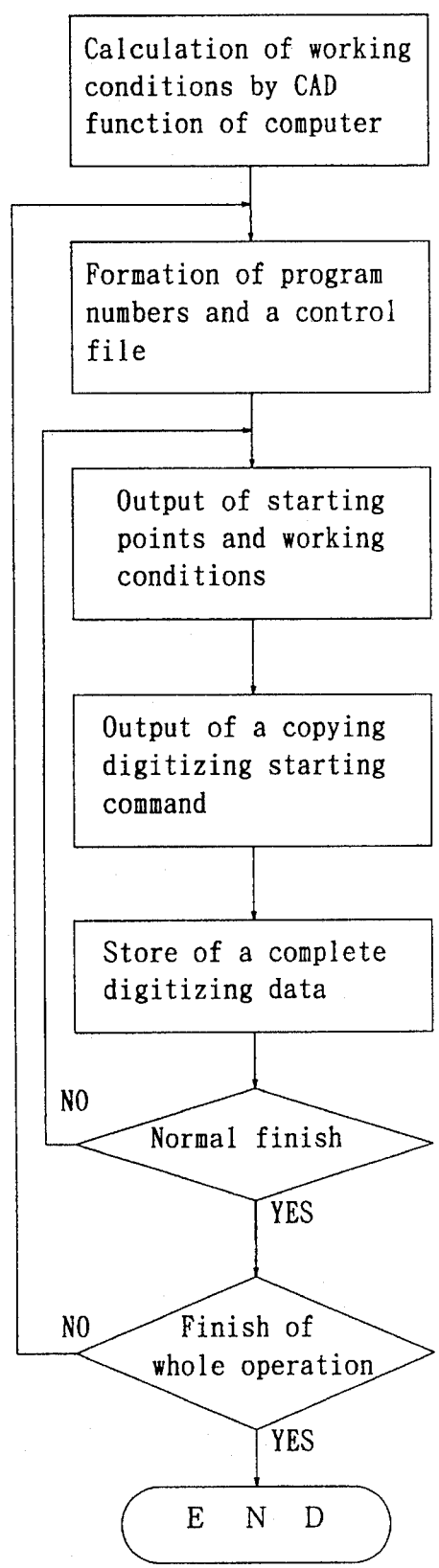
FIG. 5 is a flow chart showing the digitizing data forming operation of the control apparatus according to the invention.
Figure 6:
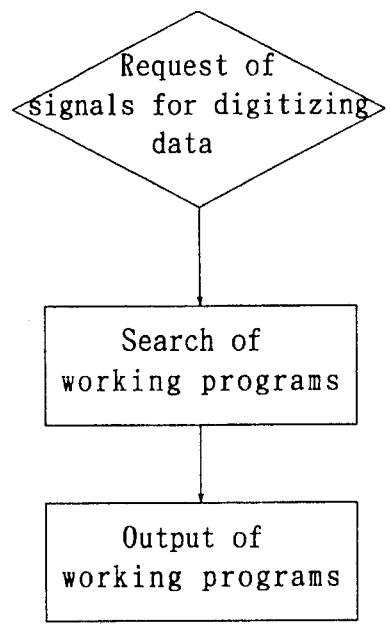
FIG. 6 is another flow chart showing the working operation of the control apparatus according to the invention.

The operation of woodworking machines according to the invention is described hereinbelow with reference to the flow charts shown in FIG. 5 and FIG. 6.

In the embodiment shown in these flow charts, working conditions such as starting points, limits and the like are first calculated by CAD function of computer 15, and these working conditions are output from computer 15 to said NC copying digitizing device 16. When a work 6 has a complicated form, a number of programs are necessary for working a single work 6, so that these programs corresponding to respective starting points are formed by said computer 15 and are given their respective program numbers. Further, said computer 15 forms a main program integrating these programs and a control file for data controlling of said main program and respective programs together.

When a copying digitizing starting command is output from said computer 15 to said NC copying digitizing device 16, the latter device 16 shifts the copying head to the specified starting points corresponding to said starting points data from said computer 15 to start NC copying digitizing operation, and digitizing data thus obtained are output to said computer 15.

The above described operation is repeated for every parts of said works 6, thereby to form a complete digitizing data of said works 6 corresponding to respective programs, and said complete digitizing data are stored in said computer 15, thus finishing the whole operation.

On the other hand, respective works 6 are inserted between respective jigs 5 and corresponding holders 7 of said woodworking machines 17. When working operation is thus prepared, respective woodworking machines 17 are started and they send request signals for digitizing data to computer 15. Upon receiving said request signals, said computer 15 searches working programs on the basis of said control file preformed by computer 15 and sends specified programs to woodworking machines 17.

According to said programs, said jigs 5 of said swivel table 2 are rotated while said swivel table 2 is driven thereby to shift said works 6 in X direction. At the same time, said carriage 11 and said elevating bed 12 are driven thereby to shift said cutting device 13 both in Y direction and in Z direction. Thus, said cutting device 13 carries out the working of said works 6.

Said computer 15 monitors any request signals from other woodworking machines 17 in a multitask manner, and upon receiving any request signals, said computer 15 searches required programs and transfers digitizing data to the requesting woodworking machines 17, thereby to carry out an online working. In this manner, working operation of a plurality of woodworking machines 17 on the one hand and forming operation of digitizing data on the other hand can be carried out simultaneously.

In the embodiment as described above, NC copying digitizing device 16 forms digitizing data for the corresponding works 6 on the basis of the working conditions such as starting points and the like calculated by the CAD of computer 15, and the computer 15 controls the working operation on the basis of a control file including a main program integrating respective parts programs. Accordingly, even when forming respective digitizing data for respective parts of works, it is not necessary to set working conditions and form a control file including a main program by manual operation of said computer 15, so that errors with respect to working orders, starting points, program numbers and the like can be prevented, thus easy and exact forming of digitizing data being assured with a higher efficiency of digitizing data forming.

Further, in the embodiment as described above, the NC copying digitizing device 16 and the woodworking machines lines 17 are separated with each other, and the forming operation of digitizing data between the computer 15 and NC copying digitizing device 16 on the one hand and the working operation of woodworking machines 17 controlled by computer 15 on the other hand are independently carried out. Therefore, the working operation of woodworking machines can be carried out even during when copying digitizing data are formed, with a higher productivity and without any high skill on the part of operators. Even unskilled operators can carry out a high-quality and stable working by using the woodworking machines and control mechanism according to the invention.

The copying operation by NC copying digitizing device 16 is carried out only as a single operation for forming digitizing data, so that it is not necessary to use an expensive metallic mold. This is to say, a model of cheap materials such as wood can be used, which reduces the cost of model.

While the present invention has been described with reference to exemplary embodiments thereof, it will be appreciated by those skilled in the art that variations and modifications may be made thereto without departing from the spirit of the inventive concepts disclosed herein. For example, said computer 15 can be connected to the process control system and the like for carrying out simultaneously the system control of working operation.

What is claimed is:

1. Woodworking apparatus comprising:
   a. a numerically controlled digitizing device for producing digital data representative of a workpiece profile input thereto;
   b. a computer connected to said numerically controlled digitizing device, receiving digital data therefrom and providing output commands;
   c. a woodworking machine including a workpiece copying head for generating data representative of a workpiece profile for input to said digitizing device, said woodworking machine being responsive to said output commands from said computer for producing a replica of said workpiece upon said computer supplying said output commands to said woodworking machine reflecting digital data received from said digitizing device representative of said workpiece profile.

2. Woodworking apparatus comprising:
   a. a numerically controlled digitizing device for controlling the position of a copying device based upon working conditions received from a computer;
   b. said copying device operable with said digitizing device for creating an electronic representation of the profile of a model;
   c. said computer providing working condition da%a to said digitizing device and for receiving said electronic representation from said digitizing device and creating a series of output commands said electronic representation;
   d. a woodworking machine connected to said computer for receiving said output commands to control the operation of said woodworking machine so that the operation of said woodworking machine produces a workpiece having the same profile as the model;

wherein the digitizing device controls the position of said copying device based upon the working conditions received from said computer.

3. The woodworking apparatus of claim 2 wherein said working conditions comprise a series of starting points and limits.

4. The woodworking apparatus of claim 3 wherein said computer is operable in connection with a CAD to automatically calculate said working conditions.

5. The woodworking apparatus of claim 2 further comprising a plurality of woodworking machines for receiving the output commands of said computer, wherein said plurality of woodworking machines operate concurrently upon a plurality of workpieces.

6. The woodworking apparatus of claim 2 wherein said electronic representation comprises a series of coordinate data in x, y, and z directions.

* * * * *